(12) United States Patent
Mano

(10) Patent No.: US 11,204,425 B2
(45) Date of Patent: Dec. 21, 2021

(54) IMAGE ACQUISITION DEVICE FOR VEHICLES AND VEHICLE PROVIDED WITH SAME

(71) Applicant: KOITO MANUFACTURING CO., LTD., Tokyo (JP)

(72) Inventor: Mitsuharu Mano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 325 days.

(21) Appl. No.: 16/064,338

(22) PCT Filed: Dec. 1, 2016

(86) PCT No.: PCT/JP2016/085811
§ 371 (c)(1),
(2) Date: Jun. 20, 2018

(87) PCT Pub. No.: WO2017/110414
PCT Pub. Date: Jun. 29, 2017

(65) Prior Publication Data
US 2019/0025432 A1    Jan. 24, 2019

(30) Foreign Application Priority Data

Dec. 21, 2015  (JP) .............................. JP2015-248823

(51) Int. Cl.
*G01S 17/89* (2020.01)
*G01S 17/87* (2020.01)
(Continued)

(52) U.S. Cl.
CPC ............ *G01S 17/89* (2013.01); *G01S 7/4815* (2013.01); *G01S 7/4863* (2013.01); *G01S 17/18* (2020.01);
(Continued)

(58) Field of Classification Search
CPC ..... H04N 13/239; G01S 17/89; G01S 7/4815; G01S 7/4816; G01S 17/894; G01S 7/4863; G01S 17/42; B60Q 1/0023
See application file for complete search history.

(56) References Cited

U.S. PATENT DOCUMENTS 3,895,388 A    7/1975 Townsend
5,029,009 A    7/1991 Ulich et al.
(Continued)

FOREIGN PATENT DOCUMENTS

CN    1345095 A    4/2002
CN    1744789 A    3/2006
(Continued)

OTHER PUBLICATIONS

Extended European Search Report issued in counterpart European Patent Application No. 16878307.4, dated Jul. 22, 2019 (7 pages).
(Continued)

*Primary Examiner* — Luke D Ratcliffe
(74) *Attorney, Agent, or Firm* — Osha Bergman Watanabe & Burton LLP

(57) ABSTRACT

A vehicle image acquisition device includes a light emitting unit configured to emit pulsed light in a predetermined direction, an image acquisition unit configured to capture reflected light returning from a target distance area at an imaging timing set according to the target distance area and acquire a plurality of captured images having different target distances, and a timing control unit configured to control light emission period of the pulsed light and the imaging timing. The light emitting unit includes a first light source for short-distance irradiation and a second light source for long-distance irradiation, and the image acquisition unit is
(Continued)

configured by a single camera configured to capture a range irradiated by each of the first light source and the second light source.

8 Claims, 11 Drawing Sheets

(51) Int. Cl.
G01S 7/481 (2006.01)
G01S 17/18 (2020.01)
G01S 7/4863 (2020.01)
G01S 17/42 (2006.01)
G01S 17/931 (2020.01)
B60Q 1/00 (2006.01)

(52) U.S. Cl.
CPC .............. *G01S 17/42* (2013.01); *G01S 17/87* (2013.01); *B60Q 1/0023* (2013.01); *G01S 17/931* (2020.01)

(56) References Cited

U.S. PATENT DOCUMENTS

| | | | |
|---|---|---|---|
| 5,118,180 | A | 6/1992 | Wichmann et al. |
| 5,864,391 | A | 1/1999 | Hosokawa et al. |
| 6,115,511 | A | 9/2000 | Sakai et al. |
| 6,311,020 | B1 | 10/2001 | Torikoshi |
| 7,956,988 | B1 | 6/2011 | Moran |
| 10,203,399 | B2 | 2/2019 | Retterath et al. |
| 2002/0039087 | A1 | 4/2002 | Inukai |
| 2002/0051128 | A1 | 5/2002 | Koyama |
| 2002/0052711 | A1 | 5/2002 | Koyama |
| 2002/0149694 | A1 | 10/2002 | Seo |
| 2003/0155513 | A1 | 8/2003 | Remillard et al. |
| 2006/0050979 | A1 | 3/2006 | Kawahara |
| 2006/0055244 | A1 | 3/2006 | Ito et al. |
| 2006/0171703 | A1 | 8/2006 | Abe et al. |
| 2006/0215040 | A1 | 9/2006 | Sugawara |
| 2007/0058038 | A1 | 3/2007 | David et al. |
| 2007/0200747 | A1 | 8/2007 | Okai et al. |
| 2008/0007429 | A1 | 1/2008 | Kawasaki et al. |
| 2008/0157678 | A1 | 7/2008 | Ito et al. |
| 2009/0040500 | A1 | 2/2009 | Nishiushi |
| 2010/0053365 | A1 | 3/2010 | Abe et al. |
| 2010/0109938 | A1 | 5/2010 | Oswald et al. |
| 2010/0181914 | A1 | 7/2010 | Kasaba et al. |
| 2010/0207806 | A1 | 8/2010 | Takahashi et al. |
| 2010/0283845 | A1 | 11/2010 | Yokochi et al. |
| 2011/0091197 | A1 | 4/2011 | Lee et al. |
| 2011/0311130 | A1 | 12/2011 | Ichimori |
| 2012/0002050 | A1 | 1/2012 | Taniguchi et al. |
| 2012/0069176 | A1 | 3/2012 | Park et al. |
| 2012/0075534 | A1 | 3/2012 | Katz et al. |
| 2012/0200757 | A1 | 8/2012 | Kasahara |
| 2012/0249781 | A1 | 10/2012 | Vollmerhausen |
| 2012/0307230 | A1 | 12/2012 | Dorrington et al. |
| 2012/0320219 | A1 | 12/2012 | David et al. |
| 2013/0004021 | A1 | 1/2013 | Nagaoka et al. |
| 2013/0188022 | A1 | 7/2013 | Katz et al. |
| 2014/0139133 | A1 | 5/2014 | Kawasaki |
| 2014/0375815 | A1 | 12/2014 | Kanou et al. |
| 2015/0022712 | A1 | 1/2015 | Koishi |
| 2015/0125032 | A1 | 5/2015 | Yamanaka et al. |
| 2015/0160340 | A1 | 6/2015 | Grauer et al. |
| 2015/0202939 | A1* | 7/2015 | Stettner .................. B60R 21/36 701/37 |
| 2015/0241564 | A1 | 8/2015 | Takano |
| 2016/0012307 | A1 | 1/2016 | Morishita |
| 2016/0061952 | A1 | 3/2016 | Tsuji et al. |
| 2016/0182832 | A1 | 6/2016 | Koishi |
| 2016/0344965 | A1* | 11/2016 | Grauer ................. H04N 5/3594 |
| 2016/0365846 | A1* | 12/2016 | Wyland ................. G01S 17/14 |
| 2017/0156673 | A1 | 6/2017 | Uchida et al. |
| 2017/0212220 | A1* | 7/2017 | Dahlmann .......... H04N 13/239 |

FOREIGN PATENT DOCUMENTS

| | | |
|---|---|---|
| CN | 1765120 A | 4/2006 |
| CN | 1838731 A | 9/2006 |
| CN | 1977527 A | 6/2007 |
| CN | 101209691 A | 7/2008 |
| CN | 101324749 A | 12/2008 |
| CN | 101644887 A | 2/2010 |
| CN | 101784147 A | 7/2010 |
| CN | 101933065 A | 12/2010 |
| CN | 102043224 A | 5/2011 |
| CN | 102316306 A | 1/2012 |
| CN | 202305416 U | 7/2012 |
| CN | 102629972 A | 8/2012 |
| CN | 102737389 A | 10/2012 |
| CN | 102783144 A | 11/2012 |
| CN | 102792333 A | 11/2012 |
| CN | 103744078 A | 4/2014 |
| CN | 104041022 A | 9/2014 |
| CN | 104364824 A | 2/2015 |
| CN | 104380166 A | 2/2015 |
| DE | 60125683 T2 | 4/2007 |
| DE | 10 2009 045600 A1 | 4/2011 |
| JP | S56-164969 A | 12/1981 |
| JP | S59-117981 U1 | 8/1984 |
| JP | S59-198377 A | 11/1984 |
| JP | H04-215089 A | 8/1992 |
| JP | H07-043451 A | 2/1995 |
| JP | H07-325152 A | 12/1995 |
| JP | H08-065690 A | 3/1996 |
| JP | H09-257927 A | 10/1997 |
| JP | H09-274076 A | 10/1997 |
| JP | H10-132932 A | 5/1998 |
| JP | 2000-172995 A | 6/2000 |
| JP | 2004-157061 A | 6/2004 |
| JP | 2005-271836 A | 10/2005 |
| JP | 2007-232498 A | 9/2007 |
| JP | 2007271373 A | 10/2007 |
| JP | 2008-033872 A | 2/2008 |
| JP | 2008070999 A | 3/2008 |
| JP | 2008-298741 A | 12/2008 |
| JP | 2009-031165 A | 2/2009 |
| JP | 2009-092555 A | 4/2009 |
| JP | 2009-192359 A | 8/2009 |
| JP | 2009-257981 A | 11/2009 |
| JP | 2009-257983 A | 11/2009 |
| JP | 2009-258015 A | 11/2009 |
| JP | 2010-048716 A | 3/2010 |
| JP | 2010-054461 A | 3/2010 |
| JP | 2010-061304 A | 3/2010 |
| JP | 2010-066221 A | 3/2010 |
| JP | 2010-170449 A | 8/2010 |
| JP | 2010-212042 A | 9/2010 |
| JP | 2010-256291 A | 11/2010 |
| JP | 2011-013950 A | 1/2011 |
| JP | 2011-136651 A | 7/2011 |
| JP | 2012-220366 A | 11/2012 |
| JP | 2013-096905 A | 5/2013 |
| JP | 2013-160585 A | 8/2013 |
| JP | 2013-546222 A | 12/2013 |
| JP | 2014-160408 A | 9/2014 |
| JP | 2015-510586 A | 4/2015 |
| JP | 2015-135273 A | 7/2015 |
| WO | 2014/097539 A1 | 6/2014 |
| WO | 2014/178376 A1 | 11/2014 |
| WO | 2015-001550 A1 | 1/2015 |

OTHER PUBLICATIONS

International Search Report issued in PCT/JP2016/085811 dated Feb. 28, 2017 (5 pages).
Written Opinion issued in PCT/JP2016/085811 dated Feb. 28, 2017 (7 pages).
International Search Report issued in PCT/JP2016/085813 dated Feb. 21, 2017 (5 pages).
Written Opinion issued in PCT/JP2016/085813 dated Feb. 21, 2017 (5 pages).

(56) References Cited

OTHER PUBLICATIONS

Extended European Search Report issued in counterpart European Patent Application No. 16878309.0, dated Jul. 22, 2019 (7 pages).
Lin, D et al.; "Color Range Images Captured by a Four-Phase CMOS Image Sensor", IEEE Transactions On Electron Devices, vol. 58, No. 3, Mar. 2011, pp. 732-739 (8 pages).
Office Action issued in corresponding Chinese Application No. 201680074554.3, dated Dec. 5, 2019 (14 pages).
International Search Report issued in PCT/JP2016/085810 dated Feb. 28, 2017 (9 pages).
Written Opinion issued in PCT/JP2016/085810 dated Feb. 28, 2017 (6 pages).
Extended European Search Report issued in counterpart European Patent Application No. 16878306.6, dated Jul. 22, 2019 (7 pages).
Office Action issued in Japanese Application No. 2017-557832, dated Jun. 30, 2020 (18 pages).
Office Action issued in Japanese Application No. 2017-557832, dated Jan. 5, 2021 (16 pages).
International Search Report issued in PCT/JP2016/085814 dated Feb. 28, 2017 (10 pages).
Written Opinion issued in PCT/JP2016/085814 dated Feb. 28, 2017 (7 pages).
Extended European Search Report issued in counterpart European Patent Application No. 16878310.8, dated Jul. 22, 2019 (7 pages).
Office Action issued in Japanese Application No. 2017-557836, dated Jun. 30, 2020 (13 pages).
Office Action issued in Japanese Application No. 2017-557836, dated Oct. 13, 2020 (19 pages).
International Search report issued in PCT/JP2016/085815 dated Feb. 28, 2017 (9 pages).
Written Opinion of the International Searching Authority issued in PCT/JP2016/085815 dated Feb. 28, 2017 (5 pages).
Extended European Search Report issued in counterpart European Patent Application No. 16878311.6, dated Jul. 22, 2019 (6 pages).
Office Action issued in Japanese Application No. 2015-557837, dated Oct. 13, 2020 (13 pages).
Office Action issued in corresponding Chinese Application No. 201680075256.6, dated Jun. 22, 2021 (30 pages).
Office Action issued in corresponding Chinese Application No. 201680075213.8; dated Jun. 3, 2021 (22 pages).
Office Action issued in corresponding Chinese Application No. 201680075214.2; dated Jun. 16, 2021 (25 pages).
Office Action issued in corresponding European Application No. 16878306.6; dated Jun. 17, 2021 (8 pages).
Office Action issued in corresponding Chinese Application No. 201680074579.3; dated Aug. 30, 2021 (18 pages).

* cited by examiner

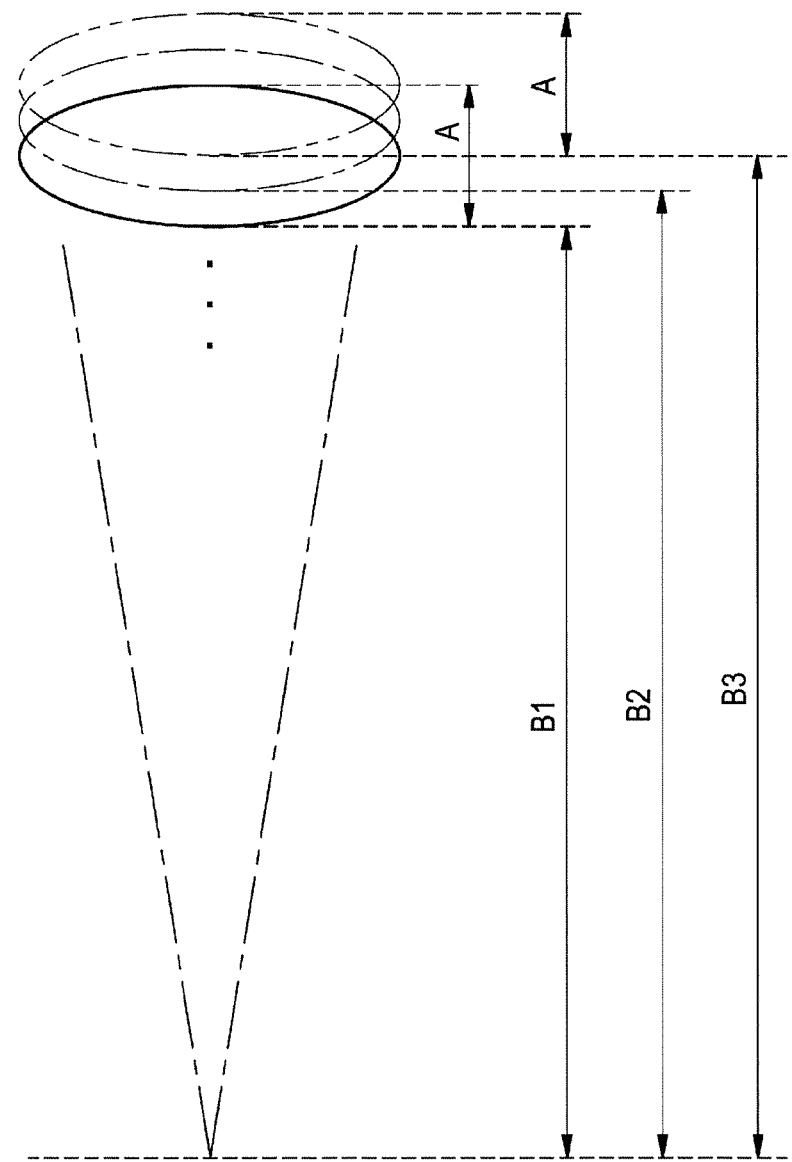
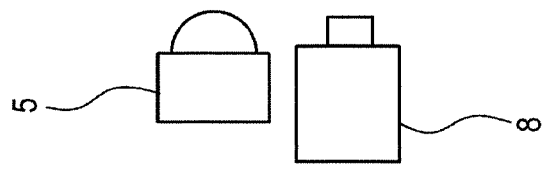
FIG. 4

IMAGE ACQUISITION DEVICE FOR VEHICLES AND VEHICLE PROVIDED WITH SAME

CROSS-REFERENCE TO RELATED APPLICATIONS

The present application claims priority to Japanese Patent Application No. 2015-248823 filed on Dec. 21, 2015, the contents of which are incorporated herein by reference in their entirety.

BACKGROUND

Technical Field

The disclosure relates to a vehicle image acquisition device and a vehicle including the same.

Related Art

Patent Document 1 discloses a distance image data generation device for a vehicle, which is a so-called TOF (Time of Flight) sensor. In the case of capturing a wide range from a near place to a far place in front of a host vehicle, such a TOF sensor captures an image by projecting pulsed light on the front side of the host vehicle at a predetermined period and varying the time from the projection of the pulsed light until the reflected light of the pulsed light is received by an imaging means, thereby generating distance image data representing a distance to an object.

CITATION LIST

Patent Document

Patent Document 1: Japanese Patent Laid-Open Publication No. 2009-257983

SUMMARY

In the TOF sensor as described in Patent Document 1, imaging is repeatedly performed while varying the time from the light emission of the pulsed light to the light reception of the reflected light. Therefore, it takes time to capture a wide range in front of a host vehicle. Further, in order to enable a light projecting means or an imaging means used in the TOF sensor to cope with a wide range capturing from a near place to a far place of a host vehicle, the configuration of a light source or a lens becomes complicated. Further, when a light source for a sensor is constituted by two (or more) optical systems of a short-distance optical system and a long-distance optical system, an increase in costs occurs.

One or more embodiments of the present disclosure aims to provide a vehicle image acquisition device capable of capturing a wide range in front of a host vehicle and reducing cost, and a vehicle including the same.

According to one or more embodiments of the present invention, a vehicle image acquisition device of the disclosure includes a light emitting unit configured to emit pulsed light in a predetermined direction; an image acquisition unit configured to capture reflected light returning from a target distance area at an imaging timing set according to the target distance area and acquire a plurality of captured images having different target distances; and a timing control unit configured to control light emission period of the pulsed light and the imaging timing, in which the light emitting unit includes a first light source for short-distance irradiation and a second light source for long-distance irradiation, and in which the image acquisition unit is configured by a single camera configured to capture a range irradiated by each of the first light source and the second light source.

According to the above configuration, the light source for short-distance irradiation and the light source for long-distance irradiation are separately provided and the single camera captures the range irradiated by each of the light sources. Therefore, it is possible to capture a wide range in front of a host vehicle and reduce costs.

The first light source may be mounted on one of left and right headlamps of the vehicle, and the second light source may be mounted on the other of the left and right headlamps.

According to the above configuration, it is possible to capture a wide range in front of a vehicle with a simple configuration using the left and right headlamps.

The single camera may capture an image in a near range by opening and closing its shutter after the reflection time of light irradiated by the first light source and reflected from the near range has elapsed, and may capture an image in a distant range by opening and closing its shutter after the reflection time of light irradiated by the second light source and reflected from the distant range has elapsed.

According to the above configuration, it is possible to capture a wide range with high accuracy and high speed by a single camera.

The first light source and the second light source may be sequentially switched to emit light, and the single camera may open and close its shutter after the reflection time of the reflected light from the near range has elapsed and after the reflection time of the reflected light from the distant range has elapsed, respectively.

The first light source and the second light source may simultaneously emit light, and the single camera may open and close its shutter after the reflection time of the reflected light from the near range has elapsed and after the reflection time of the reflected light from the distant range has elapsed, respectively.

With such a configuration, it is possible to acquire a wide range of captured image by the single camera.

According to one or more embodiments of the present invention, a vehicle image acquisition device of another example of the disclosure includes a light emitting unit configured to emit pulsed light in a predetermined direction; an image acquisition unit configured to capture reflected light returning from a target distance area at an imaging timing set according to the target distance area and acquire a plurality of captured images having different target distances; and a timing control unit configured to control light emission period of the pulsed light and the imaging timing, in which the light emitting unit is configured by a single light source, in which the image acquisition unit includes a first camera configured to capture a near range of an area irradiated by the single light source, and a second camera configured to capture a distant range of the area irradiated by the single light source, and in which the first camera and the second camera perform imaging in synchronization with the light emission of the single light source.

According to the above configuration, it is possible to capture a wide range in front of a host vehicle and reduce costs. Further, it is possible to simultaneously capture a short-distance image and a long-distance image.

The first camera may capture an image in a near range by opening and closing its shutter after the reflection time of light irradiated by the single light source and reflected from the near range has elapsed, and the second camera may capture an image in a distant range by opening and closing its shutter after the reflection time of light irradiated by the single light source and reflected from the distant range has elapsed.

According to the above configuration, it is possible to capture a wide range with high accuracy and high speed even by a single camera.

Further, a vehicle according to one or more embodiments of the disclosure includes the vehicle image acquisition device described above.

According to the above configuration, it is possible to enhance the safety in a vehicle equipped with an automatic driving system, for example.

According to one or more embodiments of the disclosure, it is possible to provide the vehicle image acquisition device capable of capturing a wide range in front of a host vehicle and reducing cost, and the vehicle including the same.

BRIEF DESCRIPTION OF DRAWINGS

FIG. 4 is a view showing a state in which captured areas are partially overlapped;

DETAILED DESCRIPTION

Hereinafter, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
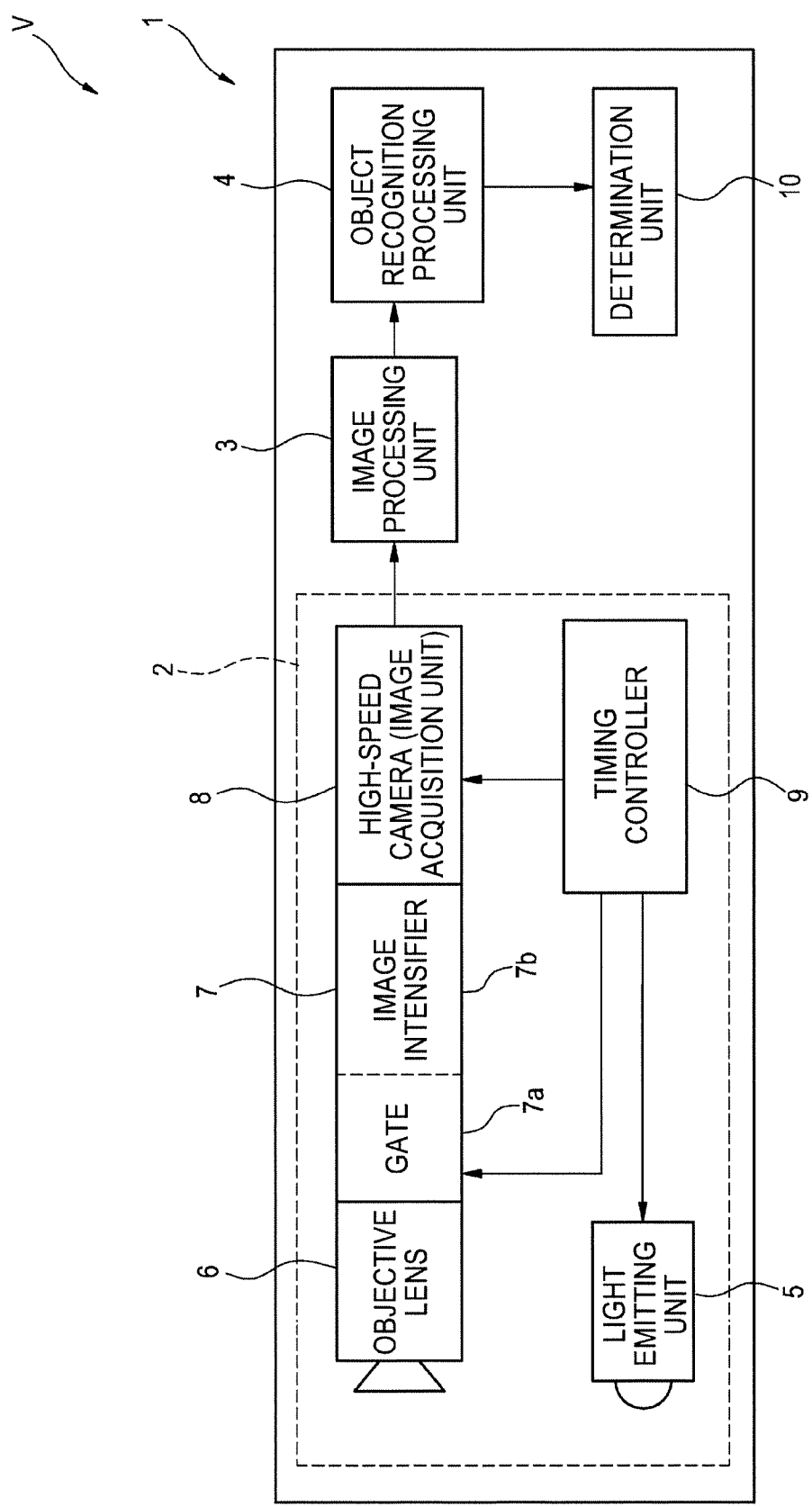
FIG. 1 is a block diagram showing a configuration of an obstacle detection device according to one or more embodiments of the present invention.
Figure 2:
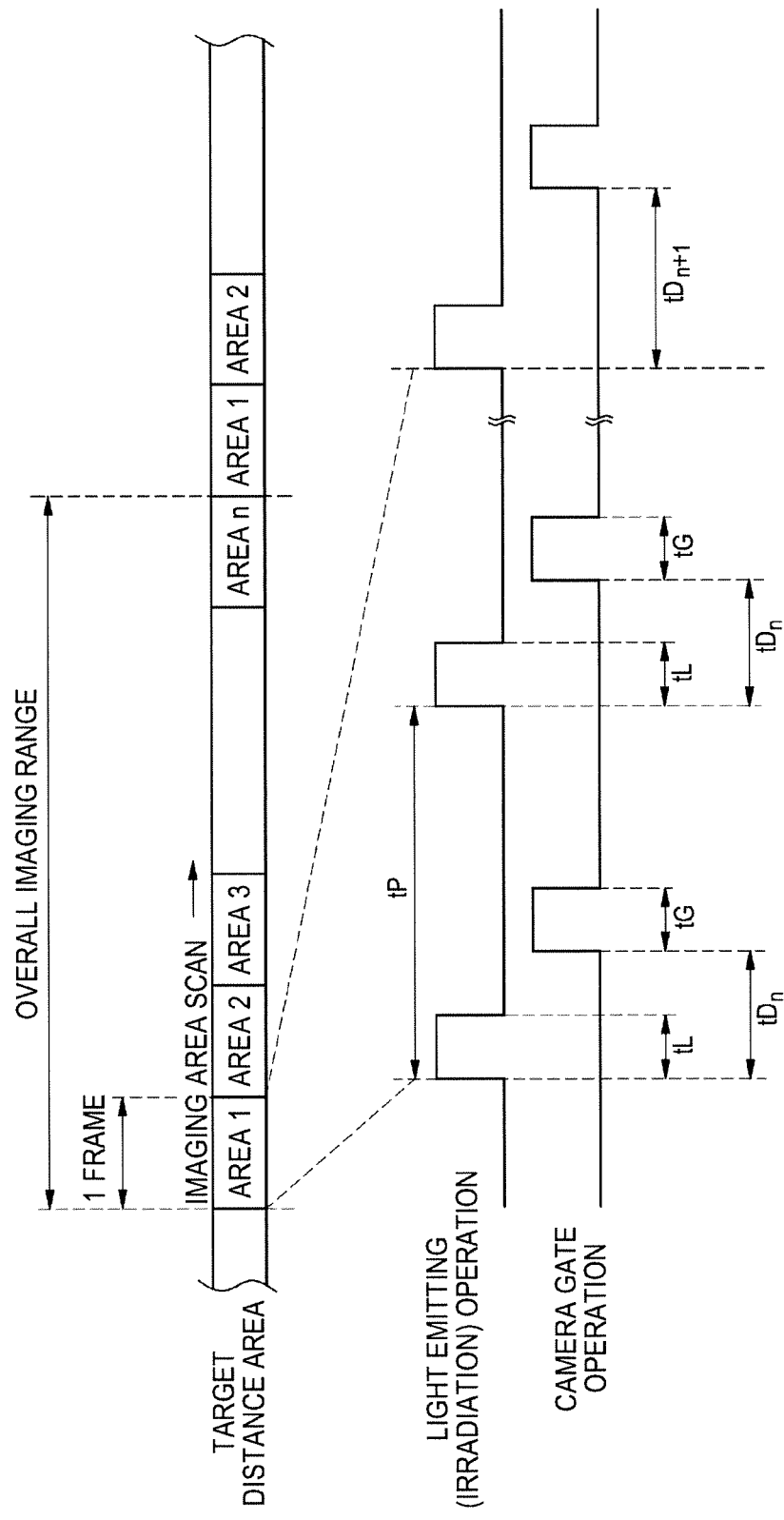
FIG. 2 is a diagram showing a temporal relationship between an operation (light emitting operation) of a light emitting unit and an operation (camera gate operation) of a gate when capturing each target distance area.

FIG. 1 is a block diagram showing a configuration of an obstacle detection device according to one or more embodiments of the present invention, to which a vehicle image acquisition device is applied. FIG. 2 is a schematic diagram showing a temporal relationship between an operation (light emitting operation) of a light emitting unit and an operation (camera gate operation) of a gate when capturing each target distance area.

As shown in FIG. 1, an obstacle detection device 1 provided in a vehicle V (host vehicle) includes an image acquisition device 2, an image processing unit (distance image data generation unit) 3, an object recognition processing unit 4, and a determination unit 10.

The image acquisition device 2 includes a light emitting unit 5, an objective lens 6, a light multiplier 7, a high-speed camera (image acquisition unit) 8, and a timing controller (timing control unit) 9.

The light emitting unit 5 is, for example, a near infrared LED disposed at the front end portion of the vehicle V. As shown in FIG. 2, the light emitting unit 5 emits pulsed light in a predetermined direction (e.g., to the front side of the vehicle V) for a predetermined light emission time tL (e.g., 5 ns) in accordance with pulse signal outputted from the timing controller 9. A light emission period tP of the pulsed light irradiated from the light emitting unit 5 has, for example, an interval of 10 μs or less.

The objective lens 6 is, for example, an optical system set to have an angle of view capable of capturing a predetermined range in front of the vehicle V and is configured to receive reflected light from an object. The objective lens 6 may be disposed in the vicinity of the light emitting unit 5 or may be spaced apart from the light emitting unit 5.

The light multiplier 7 includes a gate 7a and an image intensifier 7b.

The gate 7a is opened and closed in response to an opening/closing command signal from the timing controller 9. In one or more embodiments of the present invention, an opening time (gate time) tG of the gate 7a is set to 5 ns which is the same as the light emission time tL. The gate time tG is proportional to an imaging target length (imaging target depth) of each area (target distance area) in the entire captured area from an area 1 to an area n. As the gate time tG is lengthened, the imaging target length of each area is lengthened. The imaging target length is obtained from light speed×gate time tG. In one or more embodiments of the present invention, since the gate time tG=5 ns, the imaging target length is set to 1.5 m from "light speed (about $3\times10^8$ m/s)×gate time (5 ns)".

The image intensifier 7b is a device for viewing an image with contrast by converting extremely weak light (reflected light from the object, or the like) into electron once, electrically amplifying it, and returning it to a fluorescent image again to multiply the amount of light. The light amplified by the image intensifier 7b is guided to an image sensor of the high-speed camera 8.

The high-speed camera 8 captures an image generated from the light multiplier 7 in response to a command signal from the timing controller 9 and outputs the acquired captured image to the image processing unit 3. In one or more embodiments of the present invention, a camera with a resolution of 640×480 (horizontal: vertical), a luminance value of 1 to 255 (256 levels) and 100 fps or more is used.

The timing controller 9 controls imaging timing by setting a delay time tD ($tD_n$ and $tD_{n+1}$ in FIG. 2), which is the time from a light emission start time of the light emitting unit 5 to the opening time of the gate 7a, such that the captured image captured by the high-speed camera 8 becomes the timing of the reflected light returning from a target distance area which is a target captured area, and outputting opening/closing command signal corresponding to the delay time tD. That is, the delay time tD is a value that determines a distance (imaging target distance) from the vehicle V to the target distance area. The relationship between the delay time tD and the imaging target distance is obtained from the following formula (1).

Imaging target distance=light speed(about $3\times10^8$ m/s)×delay time $tD/2$    formula (1)

The timing controller 9 changes the imaging range of the high-speed camera 8 to the front side of the vehicle V by increasing the delay time tD by a predetermined interval (e.g., 10 ns) such that the target distance area continuously moves forward (far away) away from the vehicle V. Meanwhile, the timing controller 9 initiates an imaging operation of the high-speed camera 8 immediately before the gate 7a is opened, and terminates the imaging operation after the gate 7a is completely closed.

The timing controller 9 controls the light emitting unit 5, the gate 7a and the high-speed camera 8 so as to perform light emission and exposure multiple times for each of predetermined target distance areas (each area of area 1, area 2, ..., and area n) set in advance. The light received by the high-speed camera 8 is converted into electric charge and accumulated by repeating light emission and exposure multiple times. One captured image obtained every predetermined electric charge accumulation time is called a frame. Meanwhile, the high-speed camera 8 may acquire one captured image (one frame) for each target distance area or may acquire a plurality of captured images (several frames) for each target distance area. In this manner, the high-speed camera 8 acquires a plurality of captured images having different target distance areas and outputs the plurality of captured images acquired to the image processing unit 3.

Based on the luminance of the same pixel in the captured image of the entire captured area captured by the high-speed camera 8, the image processing unit 3 generates distance image data representing a distance to an object (target) for each pixel and outputs the generated distance image data to the object recognition processing unit 4.

The object recognition processing unit 4 specifies an object included in the distance image data. A well-known technique such as pattern matching can be used as a method of specifying an object.

The determination unit 10 determines the relationship (distance, direction, etc.) between an object (person, cars, signs, etc.) specified by the object recognition processing unit 4 and a host vehicle (vehicle V).

Next, an image acquisition operation according to one or more embodiments of the present invention will be described.

[Image Acquisition Operation]

The timing controller 9 sets the delay time tD and controls the imaging timing of the high-speed camera 8 such that the captured image captured by the high-speed camera 8 becomes the timing of reflected light returning from a predetermined target distance area. When an object is present in the target distance area, the time the light emitted from the light emitting unit 5 returns from the target distance area corresponds to the time the light reciprocates a distance (imaging target distance) between the vehicle V and the target distance area. In this manner, the delay time tD can be obtained from the imaging target distance and the light speed.

When an object is present in the target distance area, the luminance value data of a pixel corresponding to the position of the object in the captured image of the high-speed camera 8 obtained by the above method is influenced by the reflected light and represents a value higher than the luminance value data of another pixel. In this manner, the distance to the object present in the target distance area can be obtained on the basis of the luminance value data of each pixel.

Figure 3:
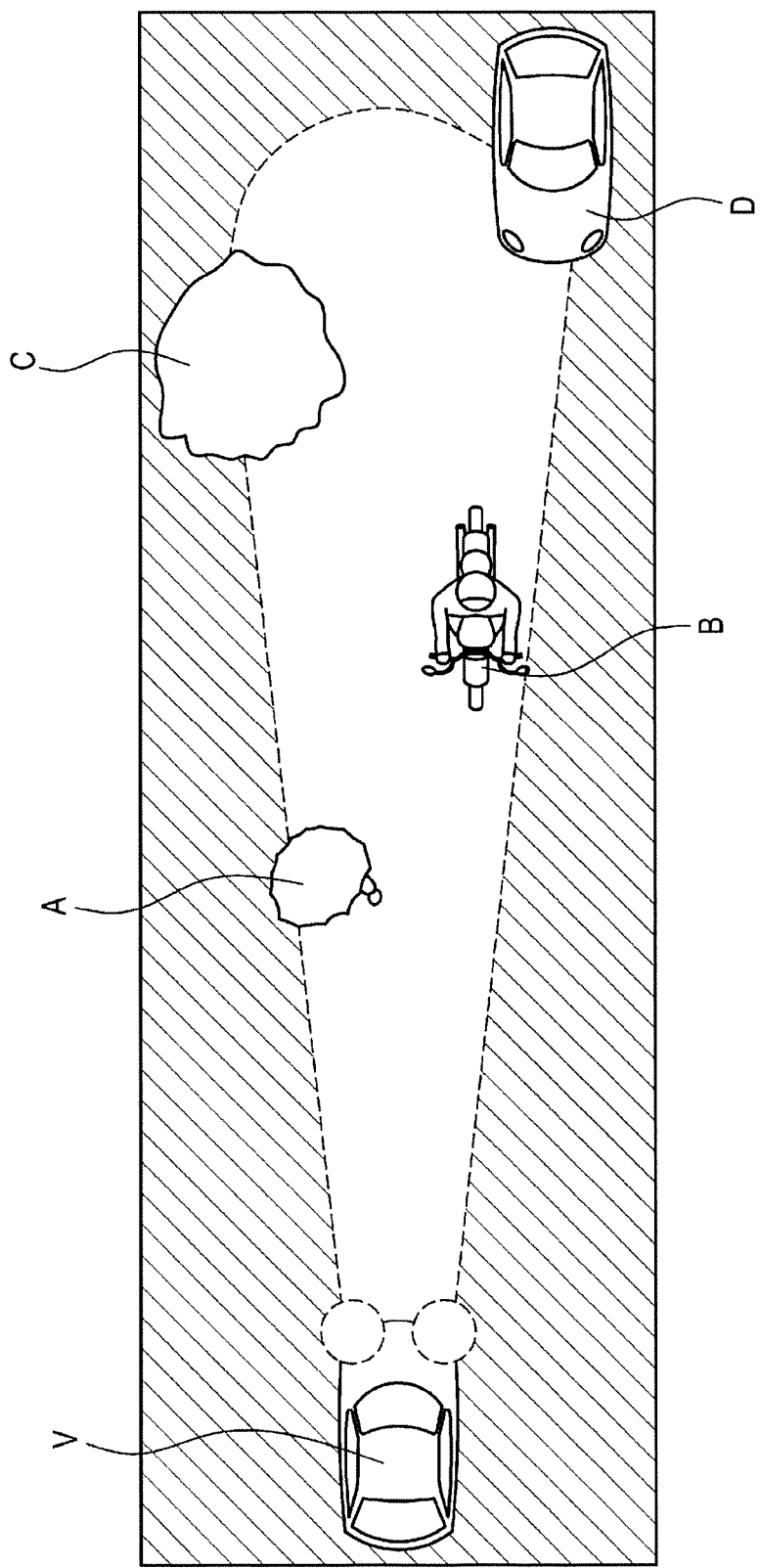
FIG. 3 is a view showing a situation where four different objects are present at different positions in front of a host vehicle.

FIG. 3 shows a situation where four objects A to D are present at different positions in front of the vehicle V. The object A is a person holding an umbrella, the object B is a motorcycle on the opposite lane side, the object C is a tree on the sidewalk side, and the object D is a vehicle (oncoming vehicle) on the opposite lane side. The distance relationship between the vehicle V and each object is set to A<B<C<D.

At this time, in one or more embodiments of the present invention, the captured areas are partially overlapped such that the reflected light from one object is reflected on the pixels of the captured images in a plurality of continuous captured areas. That is, as shown in FIG. 4, the increase amount (B2-B1) of the imaging target distance is made shorter than the imaging target length A of the captured area when imaging is performed while continuously changing the imaging target distance as B1→B2→B3→ .... Thus, the increase amount of the imaging target distance is set such that the captured areas are partially changed while overlapping.

Figure 5:
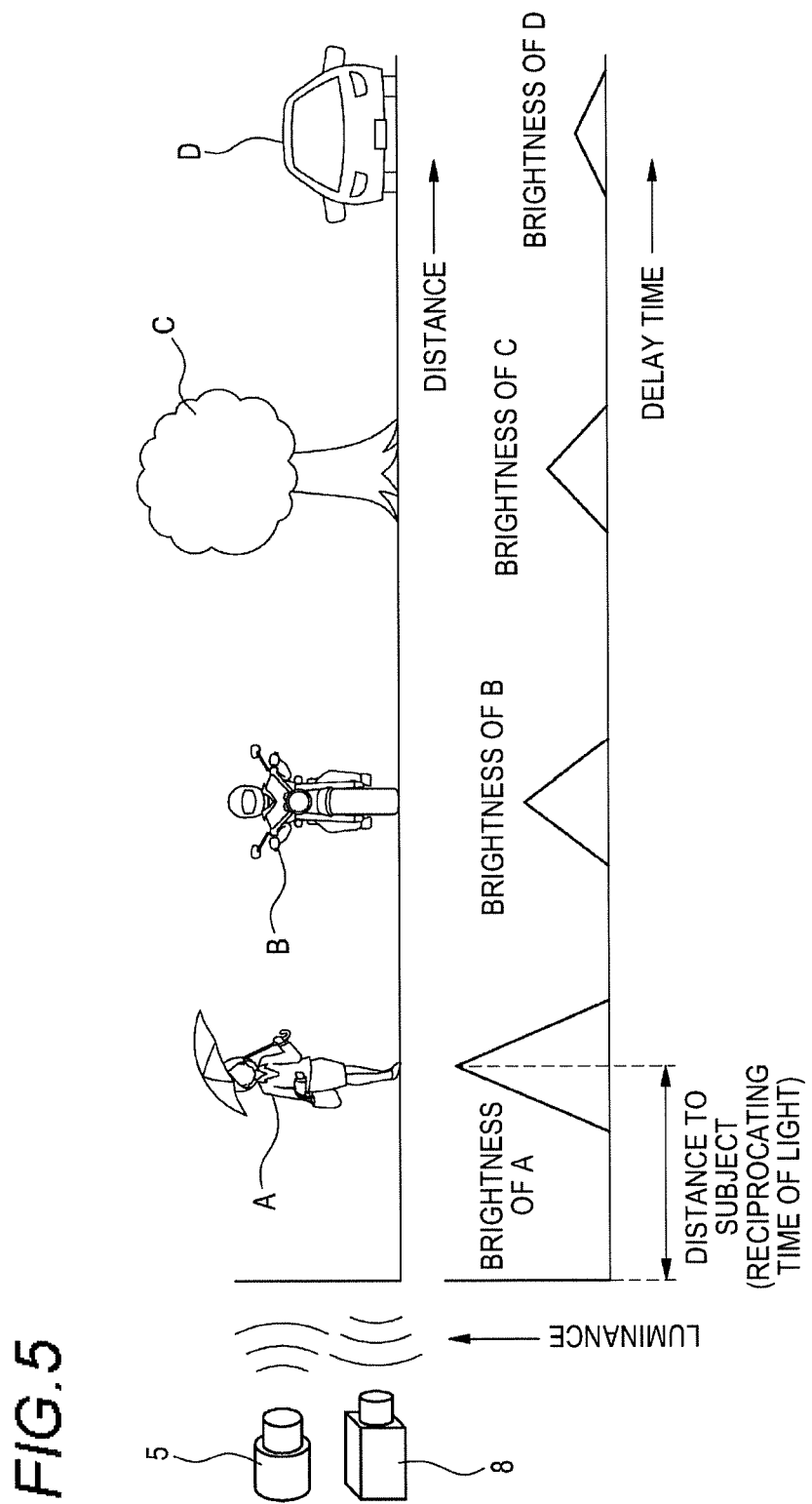
FIG. 5 is a schematic view showing temporal luminance changes of pixels corresponding to each object.

FIG. 5 is a schematic view showing temporal luminance changes of pixels corresponding to each object.

As shown in FIG. 5, when the captured areas are partially overlapped, the luminance value of the same pixel in a plurality of continuous captured images represents a triangular waveform characteristic in which the luminance value gradually increases, reaches the peak at the position of each object A to D and then gradually decreases. In this manner, the temporal luminance change of the pixel represents a triangular waveform shape when the reflected light from one object is included in a plurality of captured images. Therefore, the captured areas corresponding to the peaks of the triangular waveform shape are set to the distances from the vehicle V to each object (subject) A to D in the pixels, so that the detection accuracy can be enhanced.

Meanwhile, the obstacle detection device 1 including the image acquisition device 2 according to one or more of the above embodiments can be utilized for controlling the light distribution of so-called AHB (automatic high beam) system or ADB (adaptive driving beam) system. By using the obstacle detection device 1 together with another camera sensor mounted on the vehicle V, for example, the presence/absence and distance of an object in front of the vehicle V are detected from a plurality of captured images having the different target distance areas obtained by the image acquisition device 2, and a video in front of the vehicle V is acquired by another camera sensor. The distance of each light spot in the video acquired by the camera sensor can be obtained from the captured images acquired by the image acquisition device 2, and it can be determined whether the light spot is a vehicle or not from the distance, luminance, shape (the shape of the light spot and its periphery) and time series change or the like of each light spot. In this manner, by using the image acquisition device 2 together with another camera sensor, in particular, a distant vehicle can be detected with high accuracy and high speed, and the light distribution control of the AHB system or the ADB system can be suitably performed.

First Embodiment

Figure 6:
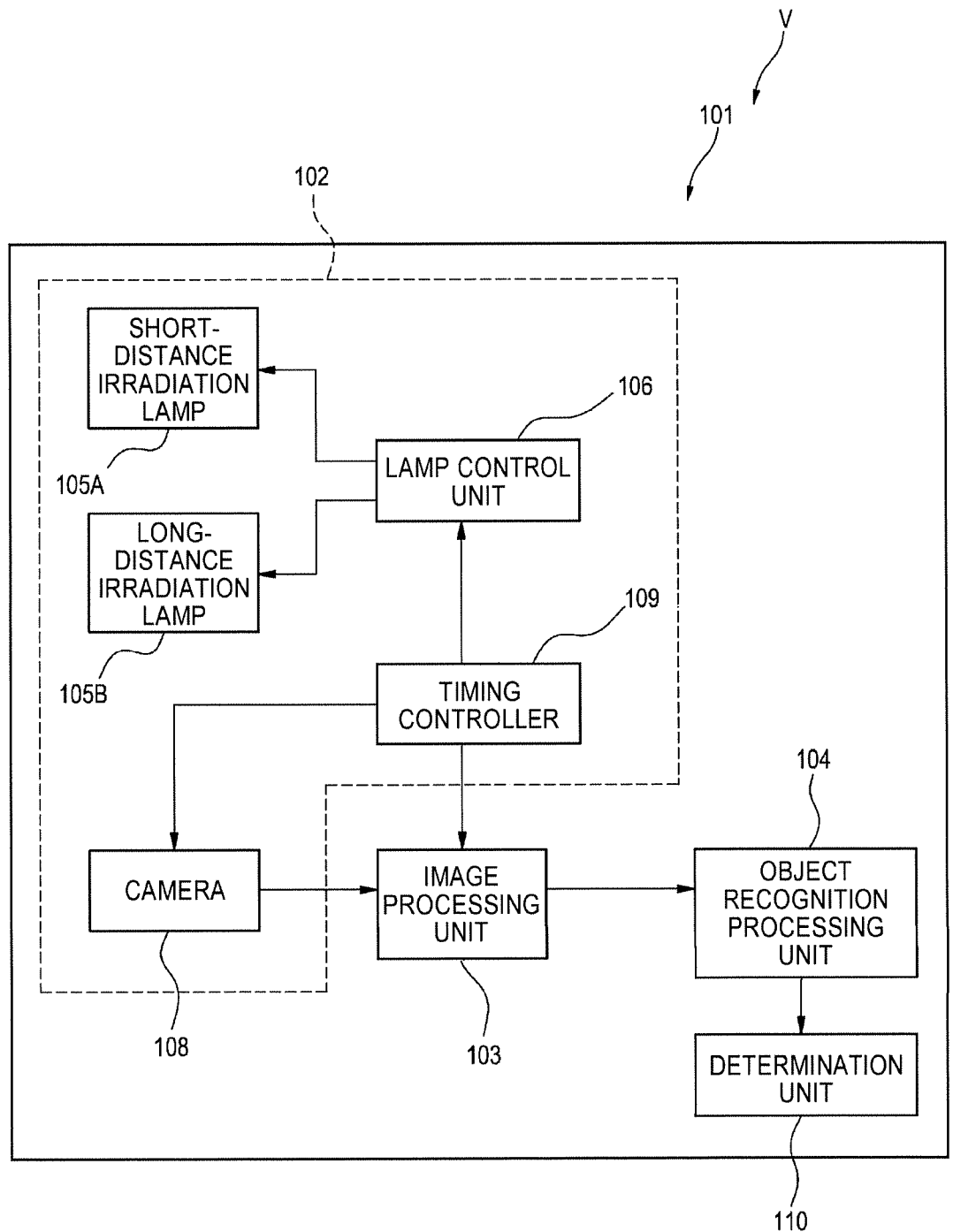
FIG. 6 is a block diagram showing a configuration of an image acquisition device according to a first embodiment.
Figure 7:
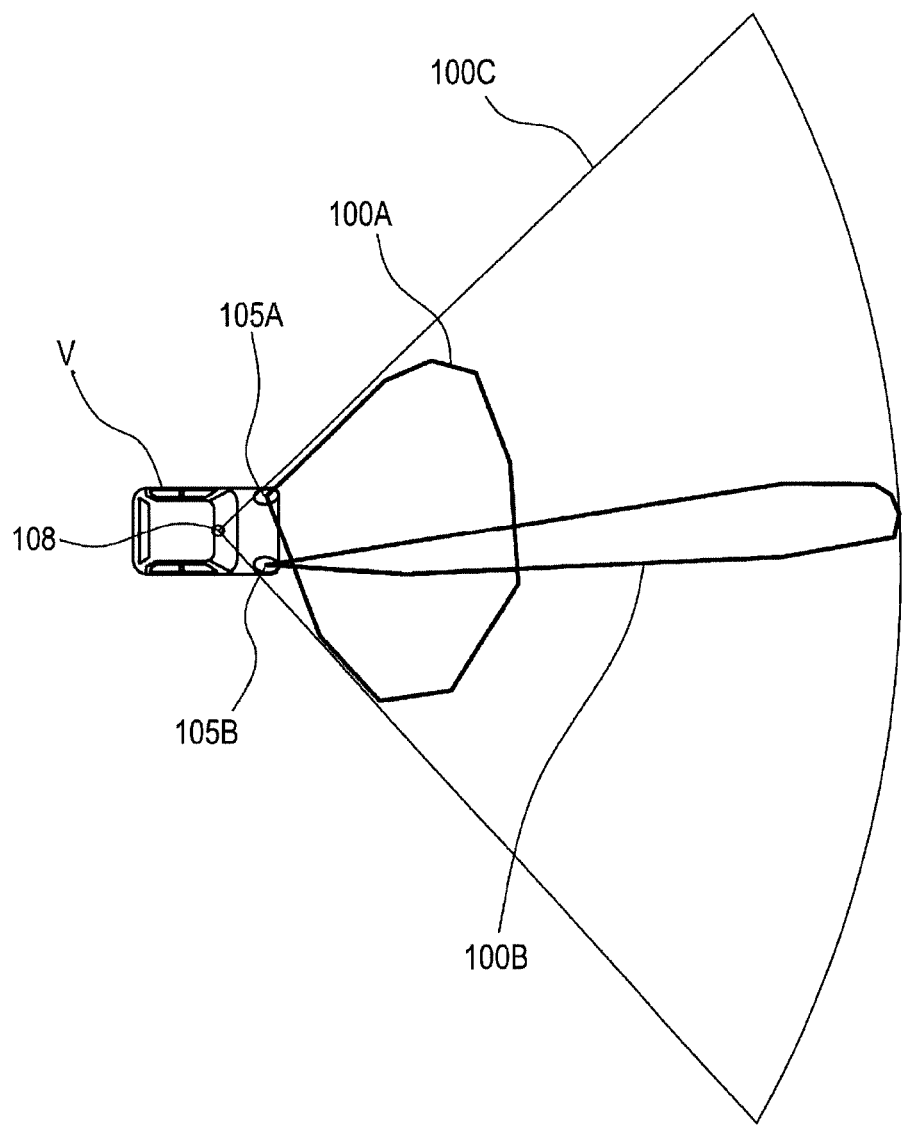
FIG. 7 is a view showing an irradiation range by a light source provided in the image acquisition device in FIG. 6 and an imaging range by an image acquisition unit.

FIG. 6 is a block diagram showing a configuration of an image acquisition device according to a first embodiment. FIG. 7 is a view showing an irradiation range by a light source provided in the image acquisition device in FIG. 6 and an imaging range by an image acquisition unit.

As shown in FIG. 6, an obstacle detection device 101 according to the first embodiment includes an image acquisition device 102, an image processing unit (distance image data generation unit) 103, an object recognition processing unit 104, and a determination unit 110. The image acquisition device 102 includes a short-distance irradiation lamp (first light source) 105A, a long-distance irradiation lamp (second light source) 105B, a lamp control unit 106, a camera (image acquisition unit) 108, and a timing controller 109.

The short-distance irradiation lamp 105A is, for example, a near infrared LED mounted in a right headlamp at a front end portion of a vehicle. The short-distance irradiation lamp 105A outputs pulsed light at the light emission period tP for the predetermined light emission time tL in accordance with a pulse signal outputted from the timing controller 109 and transmitted via the lamp control unit 106. As shown in FIG. 7, an irradiation range 100A of the short-distance irradiation lamp 105A is about 0 m to 100 m in front of a host vehicle and is, for example, in a range of ±20 to 90 degrees on the left and right around an optical axis of the short-distance irradiation lamp 105A.

The long-distance irradiation lamp 105B is, for example, a near infrared LED mounted in a left headlamp at a front end portion of a vehicle. The long-distance irradiation lamp 105B outputs pulsed light at the light emission period tP for the predetermined light emission time tL in accordance with a pulse signal outputted from the timing controller 109 and transmitted via the lamp control unit 106. As shown in FIG. 7, an irradiation range 100B of the long-distance irradiation lamp 105B is about 0 m to 200 m in front of a host vehicle and is, for example, in a range of ±5 to 10 degrees on the left and right around an optical axis of the long-distance irradiation lamp 105B.

The camera 108 captures the reflected light of the pulsed light in response to a command signal from the timing controller 109 and outputs the captured image to the image processing unit 103. Meanwhile, in the first embodiment, the objective lens and the light multiplier shown in FIG. 1 are also included in the camera 108. As shown in FIG. 7, the camera 108 can capture the reflected light from a range 100C including both of the irradiation range 100A of the short-distance irradiation lamp 105A and the irradiation range 100E of the long-distance irradiation lamp 105B.

Figure 8:
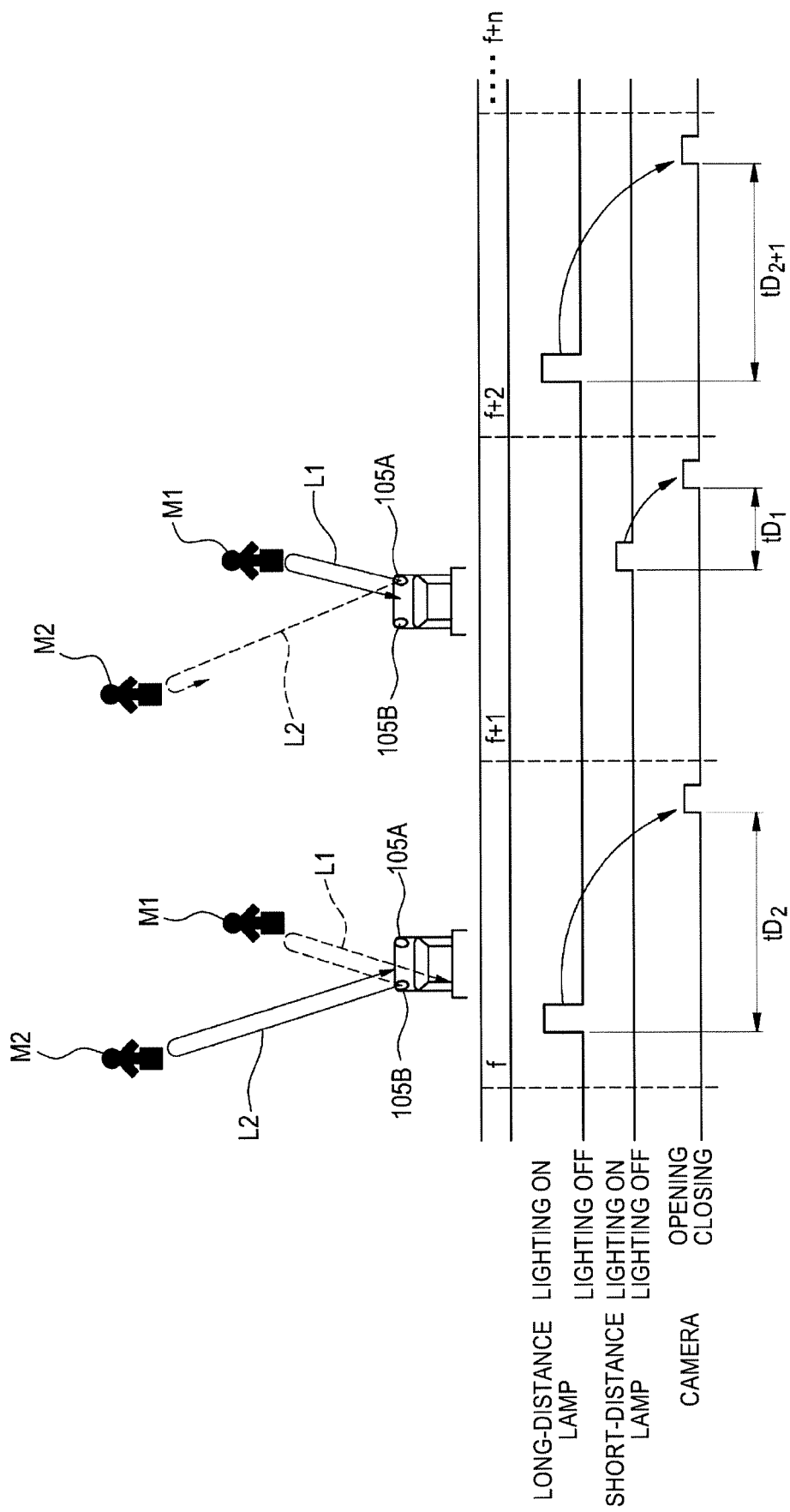
FIG. 8 is a view showing an image acquisition processing according to the first embodiment.

FIG. 8 is a view showing an image acquisition processing according to the first embodiment.

First, in process f, the timing controller 109 makes the long-distance irradiation lamp 105B emit light, and opens and closes the shutter (gate) of the camera 108 after a reflection time $tD_2$ of the reflected light from a distant area (e.g., a predetermined distance area in an area of 100 m to 200 m) included in the irradiation range 100B of the long-distance irradiation lamp 105B has elapsed. In this process f, reflected light L2 from an object (e.g., pedestrian M2) distant from a host vehicle is received, whereas light L1 reflected by an object (e.g., pedestrian M1) in the vicinity of a host vehicle is not received because the light L1 passes through the camera 108 when the shutter of the camera 108 is opened.

Subsequently, in process f+1, the timing controller 109 makes the short-distance irradiation lamp 105A emit light, and opens and closes the shutter (gate) of the camera 108 after a reflection time $tD_1$ of the reflected light from a near area (e.g., a predetermined distance area in an area of 0 m to 100 m) included in the irradiation range 100A of the short-distance irradiation lamp 105A has elapsed. In this process f+1, the reflected light L1 from the near pedestrian M1 is received, whereas the light L2 reflected by the distant pedestrian M2 is not received because the light L2 does not reach the camera 108 when the shutter of the camera 108 is opened.

Subsequently, in process f+2, the timing controller 109 makes the long-distance irradiation lamp 105B emit light again, and opens and closes the shutter (gate) of the camera 105 after a reflection time $tD_{2+1}$ of the reflected light from the distant area has elapsed. Similar to the process f, in the process f+2, the reflected light L2 from the distant pedestrian M2 is received, whereas the reflected light L1 from the near pedestrian M1 is not received.

Subsequently, in process f+3, the timing controller 109 makes the short-distance irradiation lamp 105A emit light again, and opens and closes the shutter (gate) of the camera 108 after a reflection time $tD_{1+1}$ of the reflected light from the near area has elapsed. Similar to the process f+1, in the process f+3, the reflected light L1 from the near pedestrian M1 is received, whereas the reflected light L2 from the distant pedestrian M2 is not received.

Similarly, in process f+4 to f+n, the timing controller 109 makes the camera 108 perform imaging at imaging timings of gradually increasing the reflection time $tD_2$ and $tD_1$ while sequentially switching the irradiation from the long-distance irradiation lamp 105B and the irradiation from the short-distance irradiation lamp 105A. In this way, the camera 108 can acquire captured images of the entire range of the target distance area. Meanwhile, the image processing unit 103 generates distance image data by combining the captured images of the entire imaging range acquired by the camera 108.

According to the image acquisition device 102 of the first embodiment described above, the following effects can be obtained.

(1) The image acquisition device 102 includes the short-distance irradiation lamp 105A, the long-distance irradiation lamp 105B, and the single camera 108 for capturing a range irradiated by each of the short-distance irradiation lamp 105A and the long-distance irradiation lamp 105B. In this manner, since the short-distance lamp 105A and the long-distance lamp 105B are separately provided and the single camera 108 is configured to capture an irradiation range by each of the lamps 105A, 105B, the complication of the configuration of the lamp (in particular, lens or light distribution mechanism) can be suppressed. Therefore, it is possible to capture a wide range in front of a host vehicle and reduce device costs.

(2) According to one or more embodiments of the present invention, the short-distance irradiation lamp 105A is mounted on one of left and right headlamps of a vehicle and the long-distance irradiation lamp 105B is mounted on the other of the left and right headlamps. According to this configuration, it is possible to capture a wide range in front of a vehicle with a simple configuration using the left and right headlamps.

(3) According to one or more embodiments of the present invention, the camera 108 captures an image in a near range by opening and closing its shutter after the reflection time $tD_1$ of the light irradiated by the short-distance irradiation lamp 105A and reflected from the near range has elapsed, and captures an image in a distant range by opening and closing its shutter after the reflection time $tD_2$ of the light irradiated by the long-distance irradiation lamp 105B and reflected from the distant range has elapsed. According to this configuration, it is possible to capture a wide range with high accuracy and high speed by the single camera 108.

(4) According to one or more embodiments of the present invention, the short-distance irradiation lamp 105A and the long-distance irradiation lamp 105B are sequentially switched to emit light, and the single camera 108 opens and closes its shutter after the reflection time $tD_1$ of the reflected light of the near range has elapsed and after the reflection time $tD_2$ of the reflected light from the distant range has elapsed, respectively. According to this configuration, it is possible to acquire a wide range of captured images by the single camera 108.

Second Embodiment

Figure 9:
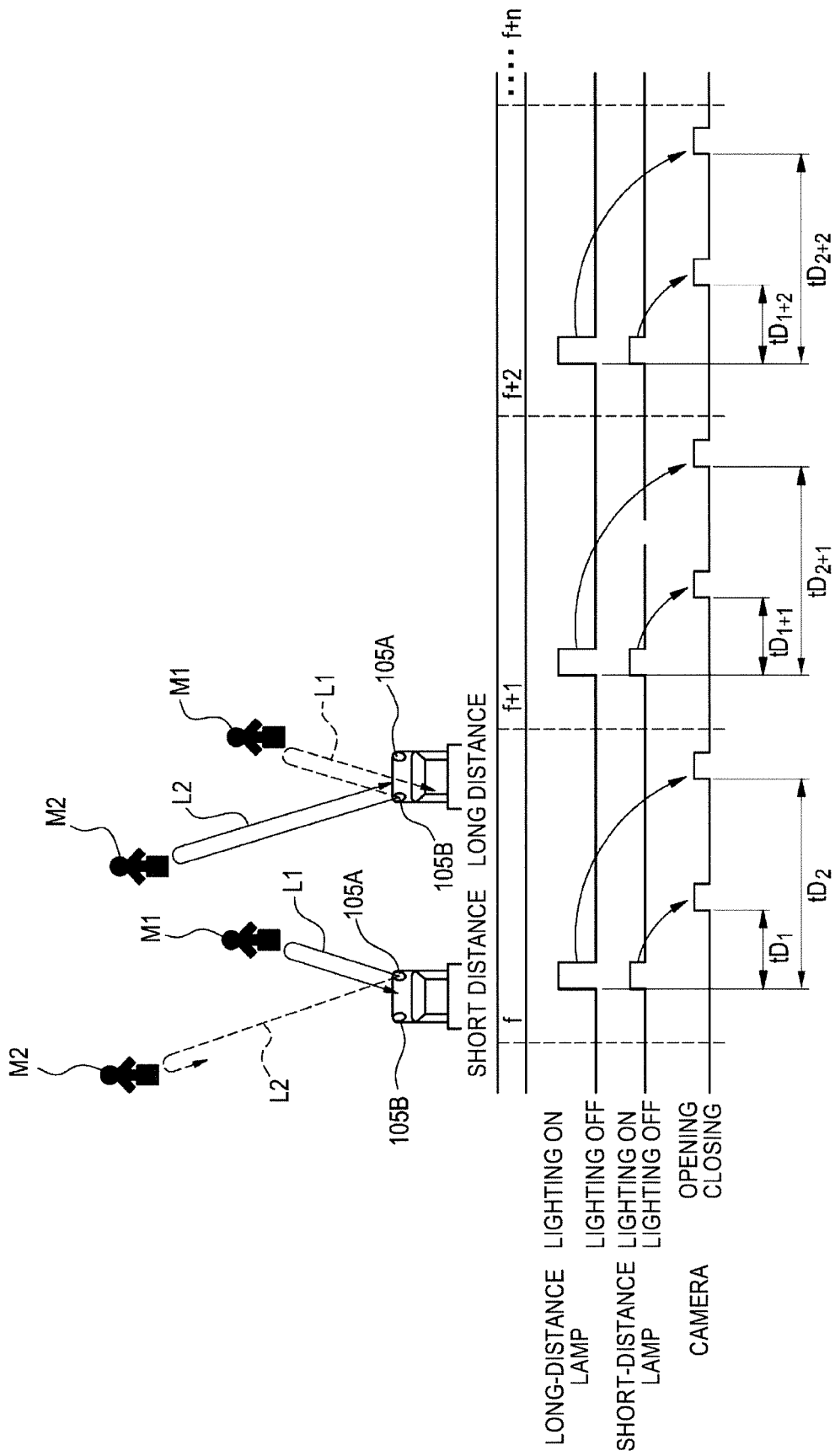
FIG. 9 is a view showing an image acquisition processing according to a second embodiment.

FIG. 9 is a view showing an image acquisition processing according to a second embodiment.

First, in process f, the timing controller 109 makes the short-distance irradiation lamp 105A and the long-distance irradiation lamp 105B emit light simultaneously, and the timing controller 109 opens and closes the shutter of the camera 108 after the reflection time $tD_1$ of the reflected light from the near area included in the irradiation range of the short-distance irradiation lamp 105A has elapsed, and opens and closes the shutter of the camera 108 again after the reflection time $tD_2$ of the reflected light from the distant area included in the irradiation range of the long-distance irradiation lamp 105B has elapsed. By the opening and closing operation of the shutter after the reflection time $tD_1$ has elapsed, the reflected light L1 from the near pedestrian M1 is received, whereas the light L2 reflected by the distant pedestrian M2 is not received because the light L2 does not reach the camera 108 when the shutter is opened. Further, by the opening and closing operation of the shutter after the reflection time $tD_2$ has elapsed, the reflected light L2 from the distant pedestrian M2 is received, whereas the light L1 reflected by the near pedestrian M1 is not received because the light L2 passes through the camera 108 when the shutter is opened.

In this manner, in the process f, the reflected light L1 from the near pedestrian M1 and the reflected light L2 from the distant pedestrian M2 are received by the camera 108 at different timings, respectively.

Subsequently, also in process f+1, similar to the process f, the timing controller 109 makes the short-distance irradiation lamp 105A and the long-distance irradiation lamp 105B emit light simultaneously, and the timing controller 109 opens and closes the shutter of the camera 108 after the reflection time $tD_{1+1}$ of the reflected light from the near area included in the irradiation range of the short-distance irradiation lamp 105A has elapsed, and opens and closes the shutter of the camera 108 again after the reflection time $tD_{2+1}$ of the reflected light from the distant area included in the irradiation range of the long-distance irradiation lamp 105B has elapsed.

Also in process f+2 to f+n, the timing controller 109 captures an image at imaging timings of gradually increasing the reflection time $tD_1$ and $tD_2$ while making the short-distance irradiation lamp 105A and the long-distance irradiation lamp 105B emit light simultaneously. In this way, the camera 108 can acquire captured images of the entire range of the target distance area.

As described above, in the second embodiment, the short-distance irradiation lamp 105A and the long-distance irradiation lamp 105B emit light simultaneously, and the camera 108 is configured to open and close its shutter after the reflection time $tD_1$ of the reflected light from the near range has elapsed and after the reflection time $tD_2$ of the reflected light of the distant range has elapsed, respectively. According to this configuration, it is possible to acquire a wide range of captured images in a short time by the single camera 108.

Third Embodiment

Figure 10:
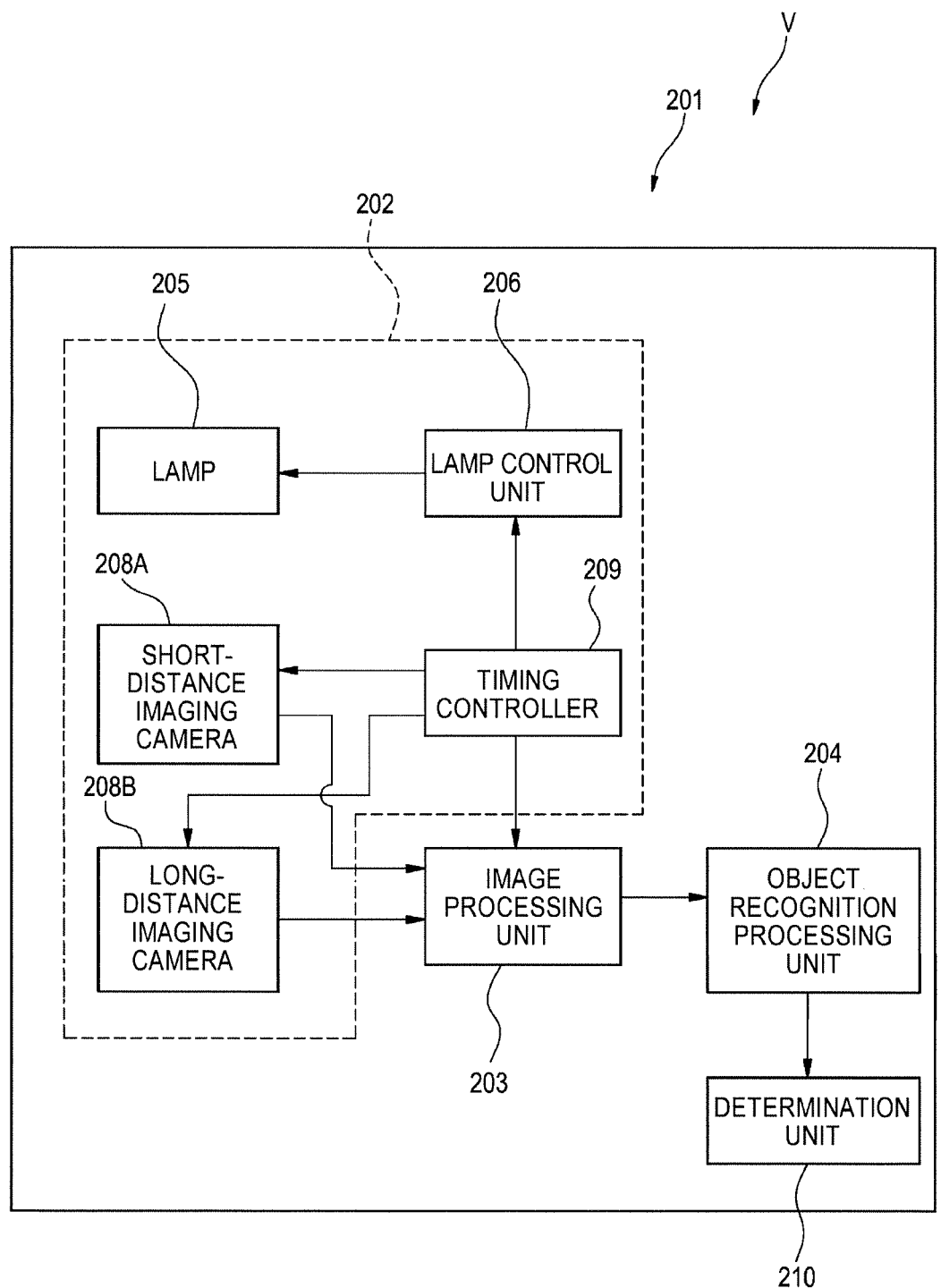
FIG. 10 is a block diagram showing a configuration of an image acquisition device according to a third embodiment.

FIG. 10 is a block diagram showing a configuration of an image acquisition device according to a third embodiment.

As shown in FIG. 10, an obstacle detection device 201 according to the third embodiment includes an image acquisition device 202, an image processing unit (distance image data generation unit) 203, an object recognition processing unit 204, and a determination unit 210. The image acquisition device 202 includes a lamp (single light source) 205, a lamp control unit 206, a short-distance imaging camera 208A (first camera), a long-distance imaging camera 208B (second camera), and a timing controller 209.

The lamp 205 is, for example, a near infrared LED mounted on a front end portion of a vehicle. The lamp 205 outputs pulsed light at the light emission period tP for the predetermined light emission time tL in accordance with a pulse signal outputted from the timing controller 209 and transmitted via the lamp control unit 206.

The short-distance imaging camera 208A captures the reflected light of the pulsed light in response to a command signal from the timing controller 209 and outputs the captured image to the image processing unit 203. Meanwhile, the objective lens and the light multiplier shown in FIG. 1 are also included in the short-distance imaging camera 208A. The short-distance imaging camera 208A can capture the reflected light from a near area (e.g., an area of 0 m to 100 m in front of the host vehicle) in the irradiation range of the lamp 205.

The long-distance imaging camera 208B captures the reflected light of the pulsed light in response to a command signal from the timing controller 209 and outputs the captured image to the image processing unit 203. Meanwhile, the objective lens and the light multiplier shown in FIG. 1 are also included in the long-distance imaging camera 208B. The long-distance imaging camera 208B can capture the reflected light from a distant area (e.g., an area of 100 m to 200 m in front of the host vehicle) in the irradiation range of the lamp 205.

Figure 11:
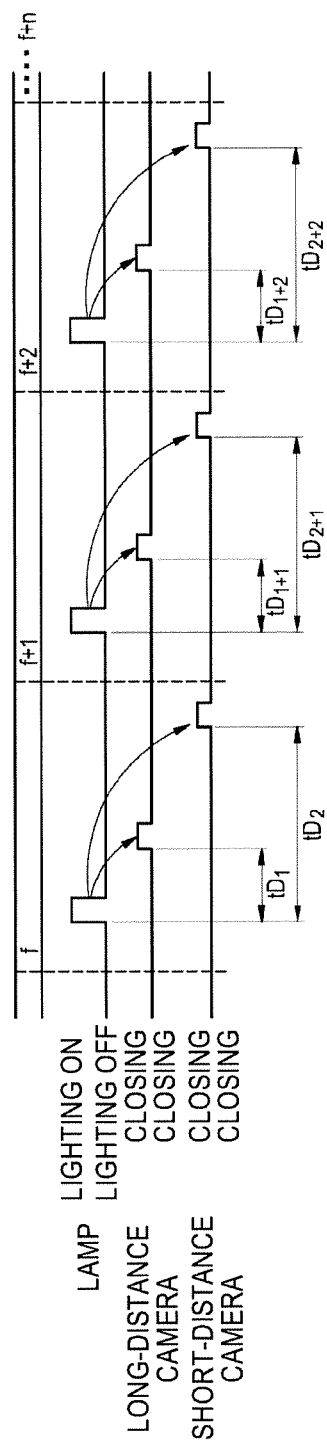
FIG. 11 is a view showing an image acquisition processing according to the third embodiment.

FIG. 11 is a view showing an image acquisition processing according to the third embodiment.

First, in process f, the timing controller 209 makes the lamp 205 emit light, and the timing controller 209 opens and closes the shutter of the short-distance imaging camera 208A after the reflection time $tD_1$ of the reflected light from the near area has elapsed, and opens and closes the shutter of the long-distance imaging camera 208B after the reflection time $tD_2$ of the reflected light from the distant area has elapsed. In this process f, the reflected light from the near pedestrian M1 and the reflected light from the distant pedestrian M2 are received by the camera 208, respectively.

Subsequently, also in process f+1, similar to the process f, the timing controller 209 makes the lamp 205 emit light, and the timing controller 209 opens and closes the shutter of the short-distance imaging camera 208A after the reflection time $tD_{1+1}$ of the reflected light from the near area has elapsed, and opens and closes the shutter of the long-distance imaging camera 208B after the reflection time $tD_{2+1}$ of the reflected light from the distant area has elapsed.

Also in process f+2 to f+n, the timing controller 209 captures an image by the short-distance imaging camera 208A and the long-distance imaging camera 208B at imaging timings of gradually increasing the reflection time $tD_1$ and $tD_2$ while making the lamp 205 emit light. In this way, it is possible to acquire the captured images of the entire range of the target distance area by the short-distance imaging camera 208A and the long-distance imaging camera 208B.

As described above, the image acquisition device 202 according to the third embodiment includes the single lamp 205, the short-distance imaging camera 208A for capturing a near range in the area irradiated by the lamp 205, and the long-distance imaging camera 208B for capturing a distant range in the area irradiated by the lamp 205. The short-distance imaging camera 208A and the long-distance imaging camera 208B capture an image in synchronization with the light emission of the lamp 205. According to this configuration, it is possible to capture a wide range in front of a host vehicle and reduce device costs. Further, since a short-distance image and a long-distance image can be simultaneously captured, it is possible to shorten the processing time at the time of image acquisition.

Although the embodiments of the present invention has been described with reference to the examples, the specific configurations of the disclosure are not limited to the configurations of the examples. Design changes and addition and the like are permitted so long as they do not depart from the gist of the disclosure according to each claim of the claims.

For example, the imaging target length, the amount of change in the imaging target distance, and the number of frames for each target distance area, and the like can be suitably set according to the performance of the cameras 8, 108, 208A, 208B and the image processing units 3, 103, 203.

In one or more of the above embodiments, as shown in FIGS. 1, 6 and 10, the cameras 8, 108, 208A, 208B are configured to function as the image acquisition unit, but the disclosure is not limited to this example. For example, the image processing units 3, 103, 203 may function as the image acquisition unit. Alternatively, a separate memory as the image acquisition unit for storing the captured images may be provided between the cameras 8, 108, 208A, 208B and the image processing units 3, 103, 203.

In one or more of the above embodiments, as shown in FIG. 1, the light multiplier 7 (the gate 7a and the image intensifier 7b) is provided between the objective lens 6 and the high-speed camera 8, but the disclosure is not limited to this example. For example, it is also possible to acquire a plurality of captured images by performing gating at a predetermined imaging timing within the high-speed camera 8 without providing the light multiplier 7.

In one or more of the above embodiments, the object recognition is performed by generating the distance image data by the image processing units 3, 103, 203. However, the object recognition may be performed from the captured images of respective target distances captured by the cameras 8, 108, 208A, 208B.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle image acquisition device comprising:
a light emitting unit configured to emit pulsed light in a predetermined direction;
an image acquisition unit configured to capture reflected light returning from a target distance area at an imaging timing set according to the target distance area and acquire a plurality of captured images having different target distance areas; and
a timing control unit configured to control light emission period of the pulsed light and the imaging timing,
wherein the light emitting unit has a first light source that emits a plurality of short-distance light pulses for short-distance irradiation and a second light source that emits a plurality of long-distance light pulses for long-distance irradiation,
wherein the image acquisition unit is configured by a single camera configured to capture a near range irradiated by the first light source and to capture a distant range irradiated by the second light source,
wherein each short-distance light pulse of the plurality of short-distance light pulses corresponds to a first reflection time measured from the first light source emitting the short-distance light pulse to the single camera capturing the near range,
wherein each long-distance light pulse of the plurality of long-distance light pulses corresponds to a second reflection time measured from the second light source emitting the long-distance light pulse to the second camera capturing the distant range,
wherein the timing control unit changes the first reflection time by a predetermined interval for the plurality of short-distance light pulses, or changes the second reflection time by the predetermined interval for the plurality of long-distance light pulses, and
wherein the image acquisition unit comprises an image intensifier that is coupled to the single camera and that amplifies the captured reflected light.

2. The vehicle image acquisition device according to claim 1,
wherein the first light source is mounted on one of left and right headlamps of the vehicle, and the second light source is mounted on the other of the left and right headlamps.

3. The vehicle image acquisition device according to claim 1,
wherein the single camera comprises a shutter, and
wherein the single camera captures an image in the near range by opening and closing the shutter after the first reflection time of light irradiated by the first light source and reflected from the near range has elapsed, and captures an image in the distant range by opening and closing the shutter after the second reflection time of light irradiated by the second light source and reflected from the distant range has elapsed.

4. The vehicle image acquisition device according to claim 1,
wherein the single camera comprises a shutter, and
wherein the first light source and the second light source are sequentially switched to emit light, and
wherein the single camera opens and closes the shutter after the first reflection time of the reflected light from the near range has elapsed and after the second reflection time of the reflected light from the distant range has elapsed.

5. The vehicle image acquisition device according to claim 1,
wherein the single camera comprises a shutter,
wherein the first light source and the second light source simultaneously emit light, and wherein the single camera opens and close the shutter after the first reflection time of the reflected light from the near range has elapsed and after the second reflection time of the reflected light from the distant range has elapsed.

6. A vehicle comprising the vehicle image acquisition device according to claim 1.

7. A vehicle image acquisition device comprising:
a light emitting unit configured to emit a plurality of light pulses in a predetermined direction;
an image acquisition unit configured to capture reflected light returning from a target distance area at an imaging timing set according to the target distance area and acquire a plurality of captured images having different target distance areas; and
a timing control unit configured to control light emission period of the plurality of light pulses and the imaging timing,
wherein the light emitting unit is configured by a single light source,
wherein the image acquisition unit has a first camera configured to capture a near range of an area irradiated by the single light source, and a second camera configured to capture a distant range of the area irradiated by the single light source,
wherein the first camera and the second camera perform imaging in synchronization with the light emission of the single light source,
wherein each light pulse of the plurality of light pulses corresponds to a first reflection time measured from the light emitting unit emitting the light pulse to the first camera capturing the near range, and corresponds to a second reflection time measured from the light emitting unit emitting the light pulse to the second camera capturing the distant range,
wherein the timing control unit changes the first reflection time and the second reflection time by a predetermined interval for the plurality of light pulses, and
wherein the image acquisition unit comprises an image intensifier that is coupled to at least one of the first camera and the second camera and that amplifies the captured reflected light.

8. The vehicle image acquisition device according to claim 7,
wherein the first camera comprises a shutter, and
wherein the first camera captures an image in the near range by opening and closing the shutter after the first reflection time of light irradiated by the single light source and reflected from the near range has elapsed, and the second camera captures an image in the distant range by opening and closing the shutter after the second reflection time of light irradiated by the single light source and reflected from the distant range has elapsed.

* * * * *